Figure 1:
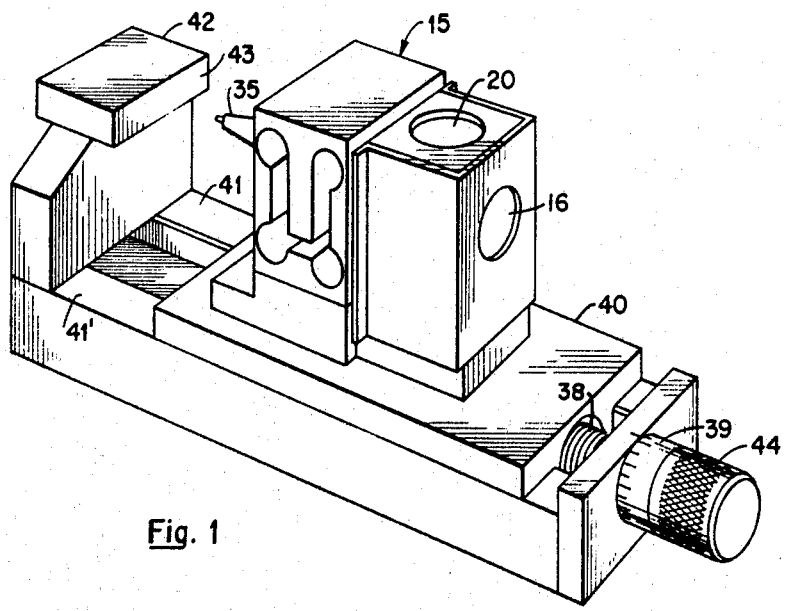

Oct. 14, 1969   L. G. WHITTEN, JR   3,472,597

INTERFEROMETRIC MEASURING DEVICE

Filed Oct. 20, 1965

INVENTOR
Leonard G. Whitten Jr.
BY
Paul E. Hodges
Agent 3,472,597
INTERFEROMETRIC MEASURING DEVICE
Leonard G. Whitten, Jr., 105 Burgess Lane,
Oak Ridge, Tenn. 37830
Filed Oct. 20, 1965, Ser. No. 498,831
Int. Cl. G01b 9/02
U.S. Cl. 356—106        2 Claims This invention lies in the field of metrology and relates particularly to interferometric measuring devices.

The usual interferometric device comprises a minimum of a beam splitter, a fixed reference reflector, and a movable reflector. Measurements are made by detecting changes in the observable interference pattern as the movable reflector changes position. Controlability of the movement of said reflector delimits the precision and accuracy of the device. This limiting factor and the heretofore efforts at controlling the movement of said reflector have provided the art with very complex, expensive and delicate instruments of great precision and accuracy. The prior art devices are in fact too complex. They are expensive to fabricate and maintain. They are supersensitive to only slight adverse conditions. Their application in practical use outside the laboratory has been historically slow.

It is not uncommon in the modern manufacturing establishment to desire means for performing very accurate measurements such as those obtainable with an interferometric measuring device. Neither is it uncommon that the surroundings wherein the measurement is to be made are not compatible with the heretofore known interferometric measuring devices. It is therefore an object of this invention to provide a rugged interferometric measuring device designed to function under the normally adverse conditions of modern shops.

White light, such an incandescent lamps or even natural light, are most usually available in any working area. An interferometer employing white light as its light source is therefore most practical. It is an object of this invention to provide an interferometer employing available white light, no integral light source being required or even desired.

Interference fringes developable with white light arise when the fixed reference reflector has superimposed thereupon the image of the movable reflector, the plane of the image being inclined at a small angle with respect to the plane of the reference reflector. The line of intersection of said planes being preferably central of either plane. This condition of intersection produces, in the field of view, the characteristic dark, zero order fringe obtainable with white light. The zero order fringe is flanked, again in the field of view, on either side by the higher order fringes spaced apart according to the angle of intersection of the two planes hereinbefore mentioned.

Measurements are made by reference to the original position of the zero order fringe. By design, as the movable reflector moves toward or away from the beamsplitter, with no change in the angle of the plane of the movable reflector, the heretofore described image correspondingly moves toward or away from the fixed reference reflector. If no change occurs in the angle of intersection, the effect in the field of view is shifting of the zero order and other fringes, no change occurring as to the inter-fringe spacing. Assuming that as the reflector and beamsplitter are aligned initially, the zero order fringe is centered on cross-hairs, movement of the movable reflector shifts the fringes away from the cross-hairs. An observer can detect readily the number of fringes between the new position of the zero order fringe and the stationary cross-hairs. With a knowledge of the wavelength of the light employed, mere routine calculation will reveal the displacement of the zero order fringe, hence the distance the movable reflector moved in creating the fringe displacement.

If the plane of the movable reflector rotates about an axis corresponding to the aforementioned intersection of the planes, the inter-fringe spacing as appearing in the field of view is increased or decreased depending upon the direction of rotation. The inherent characteristic distance between fringes, viz., a distance representing a change in path length of lambda/2, where lambda is the wavelength of the light employed, is not altered. Consequently, the sensitivity of detection of displacement of the fringes is substantially impaired. Too many closely-spaced fringes in the field of view result in any displacement being too minute for detection by practical means. Too few fringes in the field of view severely limits the permissible range of movement of the movable reflector. It is therefore an object of this invention to provide an interferometer having a movable reflector whose motion is delimited to translational reciprocal displacement of the plane of the reflector, said displacement being in a direction perpendicular to said plane.

A change of one second of arc in the angle of intersection of the aforesaid planes of said reflectors introduces an error of about one microinch in a measurement. It is, therefore, an object of this invention to provide an interferometer having integral means for (1) prealigning the movable reflector and (2) maintaining said alignment as the reflector is moved during the act of measuring.

It is also an object of this invention to provide an interferometric measuring device of compact design, inexpensive to fabricate, and having means for extending the range of permissible measurement beyond the inherent limit of the interferometer itself.

It is also an object of this invention to provide an interferometer having improved mounting means for the movable reflector thereof wherein said reflector is returned to a desired position between measurements, thereby returning the zero order fringe to a centered position with respect to a fixed reference point in the field of view.

To accomplish the objects of his invention, the inventor provides a beam splitter in a housing rigidly secured to a base member and having three ports therein 90° apart, one on each of opposite sides of said housing and one on the top or upstanding end of said housing. The beamsplitter is in register with the ports. Below the beamsplitter is provided an adjustable reference reflector. Adjacent one side of the housing, and on the common base, the inventor mounts a parallel Reed device comprising a central depending plate section supported by lateral sections possessing areas of drastically reduced thickness to provide flexibility and acting together as a parallelogram. To the central depending section, which by virtue of its mounting has only one degree of freedom of movement, the inventor secures a lug extending horizontally from the depending section in the direction of the beamsplitter and receiving on its outboard end the movable reflector to complete the optics of the device.

On the side of the central depending member opposite the mounted reflector and extending horizontally away from the parallel Reed device, is provided a contactor. Through movement of the contactor the central depending section is moved, hence the movable reflector and thus changes in the observable intereference pattern are produced. All movement of the parallel Reed device is of the nature of elastic deformation. Consequently, upon removal of force therefrom, the central depending member seeks its relaxed position, thereby providing a reference position for the movable reflector.

Figure 2:
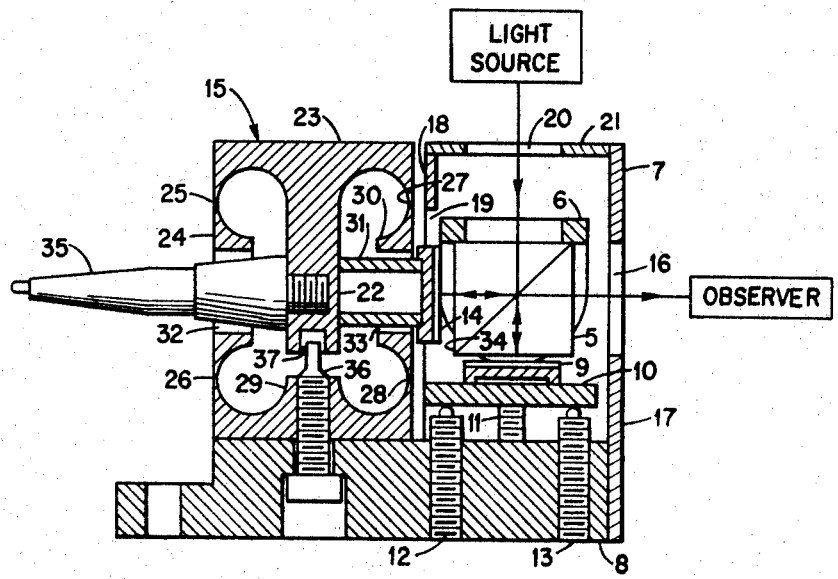

FIG. 1 is a perspective view of an interferometric measuring device of extended range capability according to the present invention, and FIG. 2 is a sectional view of the present interferometer and depicting the relative spatial relationships of the individual components thereof.

In its preferred embodiment, as depicted in FIG. 2, the present interferometer comprises a beamsplitter 5 adjustably held by mount means 6 inside a housing 7 rigidly secured on base 8, a reference reflector 9 mounted on table 10 which is vertically adjustable by virtue of a multiplicity of screw supports 11, 12, and 13 extending upward from base 8 to receive table 10, and a movable reflector 14 movably supported by a parallel Reed subassembly 15. Housing 7 is provided with three ports, a first port 16 in that side 17 of housing 7 furthermost from the Reed subassembly 15, a second port 19 in that side 18 adjacent said Reed subassembly, and a third port 20 in the top 21 of housing 7. As depicted in FIG. 2, light enters through port 20 and after passing through the optical system, exits through port 16 to an observer.

The parallel Reed subassembly 15 provides such support to reflector 14 as to permit only minute reciprocal motion of the reflector along a horizontal path. The parallel Reed is of unitary construction and comprises a central plate member 22 depending from a top section 23 supported by side members 24 and 30 having areas of drastically reduced thickness at 25, 26, 27, and 28 imparting unidirectional flexibility to said sides, and being integral with a base section 29. Central plate member 22 lies in a plane substantially parallel to the plane of face 34 of the beamsplitter. As may be visualized, side sections 24 and 30, by construction, operates as a parallelogram thereby restricting central plate 22 to only one degree of freedom of movement. Overtravel of plate 22 is precluded by screw means 36 extending upwardly through base 8 into an appropriate opening 37 in the bottom of plate 22. Side sections 24 and 30 are provided with central ports 32 and 33, respectively.

A lug 31, secured to central plate 22 near the bottom of said plate, extends horizontally therefrom to receive reflector 14 on the outboard end of the lug. Reflector 14 is thus held within port 19, parallel and adjacent to face 34 of the beamsplitter. On that side of plate 22 opposite lug 31, there is provided an elongated contactor 35 extending horizontally through port 32 a substantial distance.

Through the use of a contactor, the inventor provides a mechanical linkage between the part under examination and the optical portion of the interferometer. This is to be distinguished from the prior art devices which employ the reflective surface of the part rather than a movable reflector. Wavy surfaces, point surfaces, and the like are not amenable to measurement with such prior art devices. The present invention provides a direct linkage from a wavy surface or the like and the movable reflector thereby permitting ready and accurate measurement.

The embodiment depicted in FIG. 2 may be employed in observing minute relative movements between two bodies. For example, to observe the movement of the spindle housing of a lathe with respect to the lathe proper, one may mount the subject interferometer on the lathe proper with the contactor 35 physically touching the spindle housing. Ordinary light from the room lighting system may be used. Initial alignment is made by moving the beamsplitter and/or the reference reflector to center the zero order fringe. Thereafter, any movement of the spindle housing with respect to the lathe proper will be sensed by the contactor, reflector 14 will move accordingly thereby producing fringe displacement in the field of view. The expected relative movement is very slight, but quite consequential in modern precision machining operations. The magnitude of the expected movement dictates a measuring device of interferometric-type capability. Prior to the subject invention, no adequate measuring device was known in the art. Those devices having the measuring capability were unsuitable from a construction standpoint and those of appropriate construction lacked the capability.

An alternative embodiment of the subject invention, depicted in FIG. 1, comprises the subject interferometer in combination with a precision lead screw 38 and nut (not shown but being affixed to the bottom of base 8) driving assembly having indicator means 39 for extending the useful range of the interferometer.

In the embodiment of FIG. 1, the interferometer of FIG. 2 is mounted on a slide 40 driven reciprocably upon ways 41 and 41' by rotation of said lead screw 38. On one end of the ways, facing contactor 35, a gage block 42 is mounted to present a datum surface 43.

This embodiment, which is extremely portable and rugged, is well suited for "in the field" measurements of precision gage blocks or the like which require inspection to accuracies such as obtainable only by interferometric measuring means. In making a typical measurement, knob 44 is rotated to turn lead screw 38 and advance slide 40 until contactor 35 just touches datum surface 43. Further minute movement of knob 44 will allow the observer to establish the zero order fringe in a central position in the field of view. A reading is taken from indicator 39 and recorded. Next the contactor is baked off from the datum surface and the object to be measured is interposed between the contactor and the datum surface. The contactor is next advanced into contact with the object and the zero order fringe established in its central position as before. A second reading is taken from the indicator. Count of the revolutions of knob 44 must be kept at all times. Depending upon the pitch of the threads of the lead screw, a single rotation of knob 44 will represent a known lineal distance of movement of contactor 35. From the number of revolutions and the difference between the first and second readings of the indicator, one can readily calculate the dimension of the object under study.

It is emphasized that the description given herein is not to be deemed to limit the invention except as indicated in the claims appended hereto.

I claim:

1. In a white light interferometer, the combination comprising a beamsplitter, white light incident upon said beamssplitter, a reference reflector, a movable reflector, a parallel reed device having a depending central portion, said movable reflector being fixedly secured to one side of said depending central section, and a contactor appended to said central portion on the side opposite said movable reflector and extending perpendicularly therefrom a substantial distance.

2. Orientation means for the movable reflector and part-contacting element of a white light interferometer and comprising a unitary parallel reed device comprising a rigid base portion, substantially planar rigid side portions extending upwardly from opposite ends of said base portion and having a central opening in each, a rigid top portion joining the uppermost ends of said side portions, and a rigid centarl portion depending from said top portion and terminating at a point above said base portion and further downward than halfway between said top and said base thereby providing parallel mounting surfaces for said movable reflector and said part-contacting element, each of said side portions having at least two separated regions of essentitally equally reduced wall thickness constitutes a transverse line of drastically reduced bending moment thereby imparting to said device a single degree of freedom of movement, said degree of freedom of movement being reciprocation perpendicular to the plane of said central portion.

References Cited

UNITED STATES PATENTS

| 2,604,004 | 7/1952 | Root | 88—14 |
| 3,068,363 | 12/1962 | Samborski | 250—234 |

OTHER REFERENCES

Fundamentals of Optics, Jenkins and White, McGraw-Hill, p. 245.

RONALD L. WIBERT, Primary Examiner

C. CLARK, Assistant Examiner